(12) United States Patent
Ding et al.

(10) Patent No.: US 10,645,940 B1
(45) Date of Patent: May 12, 2020

(54) METHOD AND DEVICE FOR SHIP-BORNE FREEZING OF MARINE PRODUCTS AFTER TREATED BY HIGHLY ACTIVATED WATER AND NONDESTRUCTIVE SENSING OF ICE CRYSTALS

(71) Applicant: Zhejiang University of Technology, Hangzhou (CN)

(72) Inventors: Yuting Ding, Hangzhou (CN); Xuxia Zhou, Hangzhou (CN); Zhigang Ke, Hangzhou (CN); Shulai Liu, Hangzhou (CN); Shichen Zhu, Hangzhou (CN); Fei Lv, Hangzhou (CN); Jianhua Liu, Hangzhou (CN)

(73) Assignee: Zhejiang University of Technology, Hangzhou (CN)

( * ) Notice: Subject to any disclaimer, the term of this patent is extended or adjusted under 35 U.S.C. 154(b) by 0 days.

(21) Appl. No.: 16/591,244

(22) Filed: Oct. 2, 2019

(30) Foreign Application Priority Data

Aug. 28, 2019 (CN) .......................... 2019 1 0803840

(51) Int. Cl.
*A23B 4/09* (2006.01)
*C02F 1/30* (2006.01)
*C02F 1/38* (2006.01)
*B01J 19/08* (2006.01)
*A23B 4/18* (2006.01)
*C02F 1/48* (2006.01)

(52) U.S. Cl.
CPC ............... *A23B 4/09* (2013.01); *B01J 19/088* (2013.01); *C02F 1/30* (2013.01); *C02F 1/48* (2013.01); *A23B 4/18* (2013.01); *B01J 2219/0894* (2013.01); *C02F 2303/04* (2013.01)

(58) Field of Classification Search
None
See application file for complete search history.

(56) References Cited

U.S. PATENT DOCUMENTS

| 2,933,398 | A | * | 4/1960 | Hestnes | ................... | A23L 17/70 426/310 |
| 2004/0050682 | A1 | * | 3/2004 | Paskalov | ................... | A61L 2/10 204/157.15 |

\* cited by examiner

*Primary Examiner* — Kishor Mayekar
(74) *Attorney, Agent, or Firm* — Schwegman Lundberg & Woessner, P.A.

(57) ABSTRACT

The present invention relates to a method and a device for ship-borne freezing of marine products after treated by highly activated water and nondestructive sensing of ice crystals. Through treating the seawater with atmospheric plasma in a certain atmosphere and introducing the tail gas from plasma reactor into the seawater in tail gas collecting device, the highly activated water is obtained. After cooling by the ship-borne refrigeration system, the cooled highly activated water can be used to cool and sterilize the captured marine products timely. During the following freezing processes, both the ultra-high frequency (UHF) electromagnetic field system and pulsed ultrasonic monitoring system are applied simultaneously, which can not only effectively reduce the size of ice crystals and the juice loss of the frozen products during thawing, but also inhibits the thermal effect of electromagnetic field.

4 Claims, 3 Drawing Sheets

METHOD AND DEVICE FOR SHIP-BORNE FREEZING OF MARINE PRODUCTS AFTER TREATED BY HIGHLY ACTIVATED WATER AND NONDESTRUCTIVE SENSING OF ICE CRYSTALS

CROSS-REFERENCE TO RELATED APPLICATIONS

This Non-provisional application claims priority under 35 U.S.C. § 119(a) on Chinese Patent Application No(s). 201910803840.4 filed on Aug. 28, 2019, the entire contents of which are hereby incorporated by reference.

BACKGROUND OF THE INVENTION

Field of the Invention

The present invention relates to a field of food freezing, in particular to a method and a device for ship-borne freezing of marine products after treated by highly activated water and nondestructive sensing of ice crystals.

Description of the Related Art

There are many kinds of marine products in China, which are widely distributed. They are rich in proteins, vitamins, essential amino acids, EPA, DHA, and other essential nutrients for the human body, and have the characteristics of low fat, high protein, balanced nutrition, delicious taste and so on. Therefore, they are ideal healthy foods and widely favored by people. Presently, the marine products are a more and more important source of animal protein for people, and also an indispensable part of a reasonable diet. However, the marine products are highly perishable and have the shortcomings of easy corruption and short storage period because of the presence of abundant endogenous enzymes and microorganisms. Additionally, the unstable catch also aggravates their spoilage. These shortcomings result in a great waste of fishery resources, and seriously restrict the development of marine fisheries. Therefore, effective preservation and treatment method should be taken immediately after fishing in order to avoid the spoilage of marine products.

Presently, the commonly used preservation methods for marine products include low temperature preservation, controlled atmosphere preservation, cold sterilization preservation, chemical preservation and biological preservation, among which the low temperature preservation method is the most widely used. There are several forms of low temperature preservation method, such as refrigeration, iced storage, partial freezing, freezing and so on. For the first three methods the endogenous enzymes and microorganisms are inhibited in a certain extent, but not terminated totally. Therefore, these methods are suitable for short-time storage, but not for long-time. Freezing storage is an effective and widely used method for long-term storage of marine products, for which the temperature of the products is reduced to −18° C. or lower and more than 90% of the water in food is transformed to ice. In frozen state, the water activity of the food decreases dramatically. When the water activity is reduced to a threshold value, the bacteria cannot make use of the materials around them anymore, nor can they discharge the metabolites, and so their growth and reproduction is inhibited. Freezing also effectively inhibits the activity of enzymes and slows down the non-enzymatic reactions present in foods.

Although the freezing preservation method can effectively prevent the spoilage of marine products and maintain their freshness and nutritional value, it also has the following disadvantages:

(1) If the temperature of frozen products fluctuates or when the marine products are in thawing, the vitality of microorganisms will be restored, which may cause the spoilage of the marine products.

(2) The size of the ice crystals formed by traditional freezing methods are large and their distribution are uneven, which can destroy the cell membrane and tissue structure, resulting in the increase of drip loss and the decrease of food quality after thawing.

Considering the limited freezing conditions on ship, the difficulty of timely delivery of marine products to land for further freezing treatment, and the large amount of catch in a short time, it is particularly important to develop a new freezing method on board. Therefore, search for new ship-borne low-temperature preservation technology is of great significance to meet people's demand for high-quality marine products, and also to the development of marine fisheries.

BRIEF SUMMARY OF THE INVENTION

In order to overcome the shortcomings as mentioned above, the present invention provides a method and a device for ship-borne freezing of marine products after treated by highly activated water and nondestructive sensing of ice crystals, which includes the following steps:

1) treating a seawater by plasma in a certain atmosphere to do a plasma treatment, and introducing a tail gas from a plasma reactor into a seawater in a tail gas collecting device to do a gas treatment; both the seawater after the plasma treatment and the seawater after the gas treatment is termed as a highly activated water;

2) pre-cooling the highly activated water from step 1) to −3° C.~0° C. through a heat exchanger;

3) cooling the marine products with the pre-cooled highly activated water for two times; simultaneously, decontamination effect is obtained; the cooling processes comprise: the pre-cooled highly activated water obtained from step 2) is pumped into a spraying device and then sprayed onto a surface of the marine products for two times; a cooling period for each time is 5-10 min; then a surface temperature of the marine products is reduced to 0° C.~4° C.;

4) freezing the cooled marine products and monitoring the freezing process with an ultrasonic system simultaneously;

5) treating the freezing products with an UHF electromagnetic field when the ultrasonic system shows that ice crystals start to form in the freezing products; stop the UHF electromagnetic field treatment when the ultrasonic system shows that a phase transition is completed; and the UHF electromagnetic field is with a variable frequency in 0.9 GHz-4 GHz;

6) after the UHF electromagnetic field treatment, freezing the marine products without a electromagnetic field until a temperature of the marine products is reduced to −30° C.~−18° C.;

7) applying the marine products to a frozen storage at −30° C.~−18° C.

In the present invention, seawater is exposed to direct plasma treatment or plasma-generated tail gas treatment for getting highly activated water, which has strong sterilization capability and does not contain nitrite. After cooling by the ship-borne refrigeration system, the highly activated water is used to cool and disinfect the fresh marine products for prolonging their shelf life. The cooled fish is then exposed to freezing, in which the highly activated water attached to the surface of the marine products can form an ice layer which can effectively prevent the infection of various microorganisms in the later period. The UHF electromagnetic field applied during the freezing processes can effectively reduce the size of ice crystals and juice loss of the frozen products during thawing, thus improving the quality of frozen products. Moreover, a frequency conversion system adopted for the electromagnetic field significantly increases its action scope, and also solves the problem of non-uniform action. In the freezing process, the pulse ultrasonic monitoring system is used to detect the content of ice crystal on-line, continuously and nondestructively. Based on this information, the electromagnetic field is selectively turned on in the nucleation and ice growth periods, but not the total freezing processes, in order to reduce the thermal effect of electromagnetic field. Compared with the traditional methods, the present invention realizes the efficient and cooperative ship-borne application of "cooling and bacterial reduction by highly activated water-UHF electromagnetic field-assisted freezing-nondestructive sensing of ice crystals by ultrasonic system", therefore effectively improves the shelf life and quality of marine products. Additionally, the method has the advantages of low requirements for equipment, green environmental protection, great application prospects and so on.

Specifically, the plasma in step 1) mentioned above may be generated by corona discharge between the electrode above the liquid surface and the liquid surface; the electrode may be connected with a high voltage power supply whose output voltage may be 20-80 kV; the distance between the electrode and the liquid surface may be 10-20 mm, and the plasma treatment time may be 20-60 min;

Specifically, in step 5) mentioned above, the ice content may be obtained from the ultrasonic monitoring system according to the following method:

a) At low solute concentrations, the real food can be treated as ideal solutions (diluted sodium chloride solution). The overall temperature T of the food can be obtained from the speed of ultrasound with the equation (1) or (2) as following:

$$T = \frac{-2707.78 - \sqrt{(2707.78^2 - 4((4502.57 + 2532.5T_0 + 1462.7836T_0^2 + 333.039T_0^3) - v)991.4088}}{2((4502.57 + 2532.5T_0 + 1462.7836T_0^2 + 333.039T_0^3) - v)} T \geq -10° C., \quad (1)$$

$$T = \frac{-10525.31 - \sqrt{(10525.31^2 - 4((4111.598 + 461.266T_0 + 189.532T_0^2 + 63.106T_0^3) - v)15061.59}}{2((4111.598 + 461.266T_0 + 189.532T_0^2 + 63.106T_0^3) - v))} T < -10° C., \quad (2)$$

$T_{0\ may\ be}$ freezing-point which can be obtained either experimentally or from the literature, and v may be the detected ultrasonic velocity.

b) Water activity $\alpha_w$ in the freezing products can be analytically determined as function of T by equation (3) as following:

$$-\ln \alpha_w(T) = \left(\frac{6002.4 - \Delta C_{pm}^0 T_0}{8.314}\right)\frac{1}{T} - \frac{6002.4}{8.314 T_0} + \frac{\Delta C_{pm}^0}{8.314}\left(1 + \ln\frac{T_0}{T}\right) \quad (3)$$

$\Delta C_{pm}^0$ is the difference between pure water and ice specific heat at the initial freezing-point $T_0$ at atmospheric pressure.

c) The mole fraction of available water $\chi_{ufw}$, which may be approximately equal to the water activity $\alpha_w$, may be obtained according the equation (4):

$$\alpha_w(T) = \chi_{ufw}(T) = \frac{\frac{m_{ufw}(T)}{M_w}}{\frac{m_{ufw}(T)}{M_w} + \frac{m_{dm}}{M_{dm}}} \quad (4)$$

Where $m_{dm}$ may be the dry matter fraction; $M_w$ and $M_{dm}$ are the molecular weights of water and dry matter, respectively. At $T_0$, the mass fraction of unfrozen free water ($m_{ufw}$) may be equal to the total free water content($m_{fw}$), and so $M_{dm}$ can be easily obtained from equation (3) and equation (4).

d) The ice content in the freezing marine products may be obtained according to the equation (5):

$$m_{ice} = m_{fw} - m_{ufw}(T) = m_{fw} - \frac{\alpha_w \frac{M_W}{M_{dm}} m_{dm}}{1 - \alpha_w} \quad (5)$$

e) Assuming the ice crystals are spherical and have the same radius, the radius of ice crystals r during UHF electromagnetic field-assisted freezing can be obtained as the function of T according to equation 6:

$$r(T) = \left(1 + \frac{0.6}{T - T_0 - 0.6}\right) \cdot r_{fin} \quad (6)$$

$r_{fin}$ refers to the final radius of ice crystals.

Specifically, in step 5) mentioned above, the electromagnetic field treatment may be intermittent; in a period of the electromagnetic field, the actual working time may be 50%-60% of its period, and the processing intensity may be 100-500 W/kg products.

Specifically, in step 1) mentioned above, the working gas for the plasma treatment may be oxygen, which may be introduced into the plasma reactor through gas control valve at a flow rate of 5-10 L/min.

Specifically, in step 1) mentioned above, the seawater may be with salt content at 1.5%-10%.

Additionally, the present invention also relates a device for ship-borne freezing of marine products after treated by highly activated water and nondestructive sensing of ice crystals, which includes the plasma generation system, the tail gas collecting system, the heat exchanger, the cooling system and the freezing system.

Specifically, the plasma generation system may be composed of a high voltage power supply, an electrode, a plasma reactor and a gas chamber. The plasma reactor may be a sealed container, which includes a seawater inlet, inactivated water outlet, a gas inlet and a gas outlet. The gas inlet may be connected with the gas chamber and the gas outlet may be connected with the tail gas collecting system. Seawater may be pumped into the plasma reactor and then exposed to plasma treatment. The high voltage power supply can provide the maximum voltage at 20 kV-80 kV. The electrode may be a metal rod, whose one end may be connected with the power supply and the other end may be suspended above the surface of seawater with distance at 10-20 mm. The gas chamber provides oxygen as working gas for the plasma treatment. Oxygen may be introduced into the plasma reactor before plasma initiation at a flow rate of 5-10 L/min.

Specifically, the tail gas collecting system may be also a sealed container, which includes a seawater inlet, an activated water outlet, a gas inlet and a gas outlet.

Specifically, the heat exchanger may be connected with the water outlets of both plasma reactor and the tail gas collecting system.

Specifically, the cooling system may be composed of a conveyor belt and two water spraying devices. The latter may be connected with the heat exchanger via pumps.

Specifically, the freezing system may be composed of an UHF electromagnetic field processing chamber, several vertical freezing plates in the chamber, three UHF electromagnetic field generating systems and a pulsed ultrasonic monitoring system. The UHF electromagnetic field processing chamber may be a metal cavity, whose front surface, rear surface and bottom surface are installed with the UHF electromagnetic field generating system. The UHF electromagnetic field generating system may be with frequency at 0.9 GHz-4 GHz.

Specifically, the ultrasonic monitoring system may be a multi-frequency pulse generator whose frequency may be in 30 MHz-100 MHz, consisting of a pulse generator, two piezoelectric plates, an oscilloscope and a computer. The two piezoelectric plates are parallelly installed in the middle of two adjacent freezing plates, one of which may be served as emitter and another may be served as receptor. An ultrasonic pulse may be induced in the emitter with the pulse generator and received in the receptor. The signal is captured and visualized with an oscilloscope which may be connected with a computer.

Specifically, the UHF electromagnetic field generating system may be composed of a transformer, a magnetron, a waveguide, a frequency conversion board and a power conditioner.

Specifically, the heat exchanger may be connected with the ship-borne refrigeration system to form a circulation loop; liquid ammonia, Freon, carbon dioxide etc. with temperature at −35° C.~−25° C. or lower may be used as the cryogen.

The principles of the present invention are as following:

The plasma herein refers to an ionized gas which consists of a large number of electrons and charged ions. It is the fourth state of matter and electrically neutral as a whole. Plasma treatment can produce many kinds of reactive species, including long-lived species (ozone, hydrogen peroxide, nitrogen oxides and so on), short-lived free radicals (hydroxyl radicals, superoxide anions, and so on), and physical factors (ultraviolet, charged particles, electrons and other physical factors). The chloride ion in seawater can be oxidized by plasma-generated hydroxyl radicals and ozone to form chlorine-containing active groups, which have strong sterilization capability. Therefore, the cooled highly activated water can be used not only for cooling the marine products, but also for sterilization. During freezing, the UHF electromagnetic field treatment causes a limited oscillation of the temperature of the freezing products during the nucleation and crystal growth phases. The limited oscillation of the temperature can further induce recurring melting and regeneration of ice, which in turn prohibits the crystal growth and leads to the formation of numerous smaller ice crystals. The reduction of the size of the ice crystals can reduce the drip loss of the frozen marine products after thawing, and improve their quality. In addition, UHF electromagnetic field with frequency conversion has a large penetration depth and can act more uniform. Therefore, it is suitable for large-scale applications on ship. Indeed, the thermal effect of electromagnetic field also has some negative effects on the freezing process, such as prolonging the freezing time. In order to minimize the negative impact of electromagnetic field, it is necessary to reduce the working time of UHF electromagnetic field during freezing. In order to do this, we need to precisely monitor the freezing process in real time. Ultrasound is a kind of sound wave whose frequency is higher than 20000 Hz. It has the advantages of good direction, strong penetration ability and easy to obtain concentrated sound energy. The transmission speed of ultrasound in matter is highly dependent on the physical state of the matter. Its transmission speed in water and ice is clearly different. When water is in liquid state, the ultrasonic velocity decreases with the decrease of temperature. While at the stage of nucleation, the ultrasonic velocity increases obviously. With the increase of ice content, the ultrasonic velocity increases until the plateau stage at which most of the water (higher than 90%) is transformed into ice. Based on this principle, the real-time monitoring of ice content by ultrasound during the freezing process clearly tell us when we need to start the electromagnetic field treatment and when to stop.

Compared with the prior art, the present invention has the following advantages:
1) The present invention makes use of the synergy of cooling and disinfection by highly activated water, UHF electromagnetic field-assisted freezing and non-destructive monitoring of the ice crystals with ultrasound system, which overcomes the defects of present technology used for preserving marine products on ship, and therefore improves the quality of the frozen marine products.
2) The present invention uses seawater for plasma treatment. Therefore, the highly activated water can be prepared easily on ship at any time, and can be used in a large scale for cooling and sterilizing the marine products on ship.
3) The present invention adopts corona discharge as the form of plasma, which is more stable than other discharge forms and can generate more reactive species. Therefore, the obtained highly activated water is with stronger sterilization capability.
4) The present invention uses oxygen as the working gas for plasma treatment, thus avoiding the formation of nitrite and other nitrogen-containing harmful components in the highly activated water, which are common sterilization factors for plasma activated water. In addition, the tail gas is also utilized in the present invention. Therefore, this method is safe, efficient and environmentally friendly.
5) The present invention utilizes the UHF electromagnetic field-assisted freezing method to freeze the marine products, which effectively reduces the size of ice crystals and improves the quality of frozen products.
6) The present invention adopts frequency conversion at 0.9 GHz-4 GHz for the UHF electromagnetic field, which has a significantly larger penetration depth and a more uniform action, thus suitable for use in large space, such as freezing of marine products on ship. In addition, the electromagnetic field at 0.9 GHz has a lower heating rate, thus reducing the thermal effect of electromagnetic field.

7) The present invention adopts the intelligent pulsed ultrasound system to monitor the content of ice crystals in marine products in real-time during the freezing processes, from which we can control the working time of UHF electromagnetic field precisely. Therefore, the negative impact of the electromagnetic field to the freezing process is controlled as far as possible.

DETAILED DESCRIPTION OF THE INVENTION

The further description of the present invention is made with figures.

Embodiment 1

Figure 1:
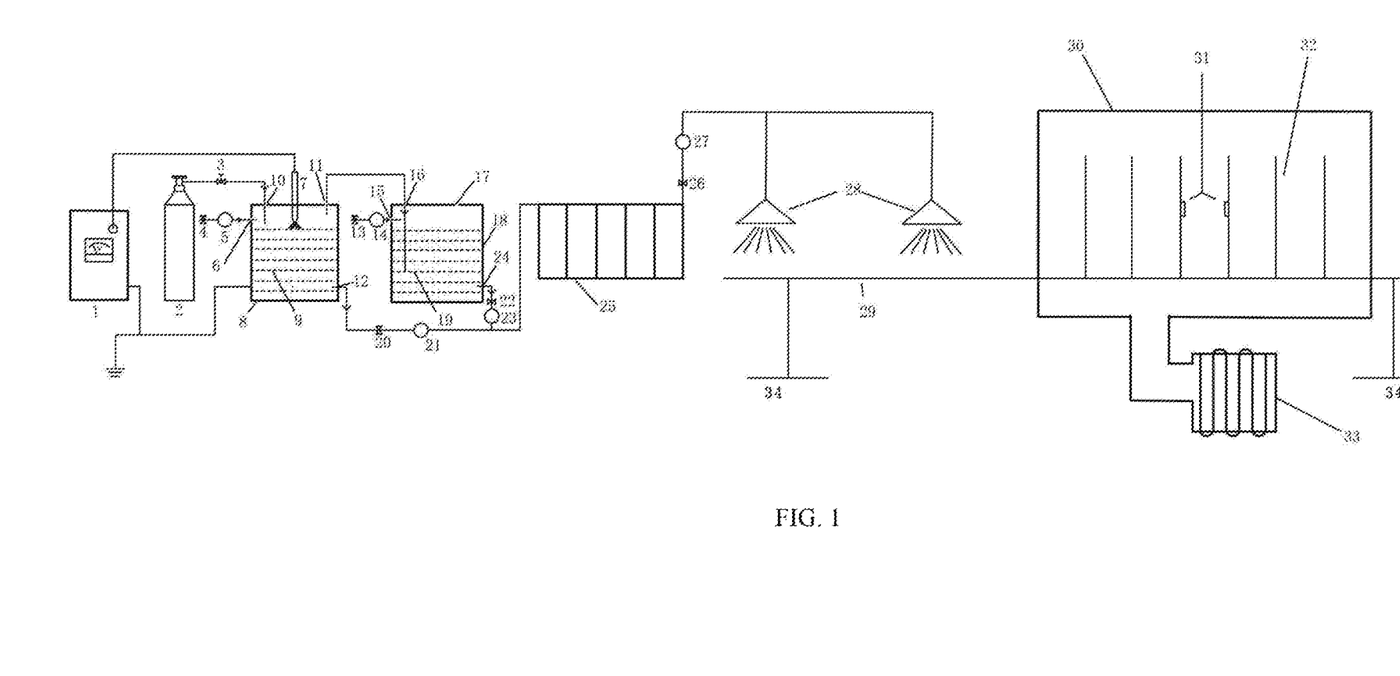
FIG. 1 shows a drawing of advice for ship-borne freezing of marine products after treated by highly activated water and nondestructive sensing of ice crystals.

FIG. 1 shows a high-functional device according to the present invention, which comprises a power supply 1, a gas chamber 2, a high-voltage electrode 7, a plasma reactor 8, a tail gas collecting device 18, a heat exchanger 25, a spraying device 28, conveyor belt 29, a UHF electromagnetic field cavity 30, an ultrasound monitoring system (31 is the piezoelectric plates of the ultrasound monitoring system), vertical freezing plates 32 and an UHF electromagnetic field generating system 33.

Preferably, the power supply 1 is a high-voltage power supply with the maximum output voltage at 20-80 kV.

Preferably, the gas chamber 2 provides oxygen as the working gas for the plasma treatment, and the gas control valve 3 controls the flow rate of oxygen.

Preferably, the plasma reactor 8 is a closed vessel with a gas inlet 10, a gas out let 11, a seawater inlet 6 and an activated water outlet 12. Both valves (4, 20) and pumps (5, 21) are installed at the seawater inlet and activated water outlet, respectively. The high-voltage electrode 7 is inserted into the plasma generator 8 and suspended above the surface of seawater 9. The distance between the top of the electrode and the water surface is 10-20 mm. The other end of the electrode is connected with the high-voltage power supply. Seawater with salt content at 1.5%-10% is pumped into the plasma reactor 8 for plasma treatment.

Preferably, the tail gas collecting device 18 is a closed vessel with a gas inlet 16, a gas out let 17, a seawater inlet 15 and an activated water outlet 24. Both valves (13, 22) and pumps (14, 23) are installed at the seawater inlet and activated water outlet, respectively. Seawater with salt content at 1.5%-10% is pumped into the tail gas collecting device 18 for absorbing the tail gas.

Preferably, both the activated seawater 9 in the plasma generator and the activated seawater 19 in the tail gas collecting device 18 are pumped into the heat exchanger 25 for cooling. Both the activated seawater 9 and the activated seawater 19 are called highly activated water. The heat exchanger is connected with the ship-borne refrigeration system to form a circulating loop. Liquid ammonia, Freon, carbon dioxide etc. with temperature at −35° C.~−25° C. or lower is used as the cryogen. The temperature of the highly activated water after cooling is at −3° C.~0° C.

Preferably, the spraying device 28 is equipped with a water regulator. The cooled highly activated water is pumped into the spraying device by water pump 27, and then used for cooling the marine products for two times. The cooling period is 5-10 min for each time. The surface temperature of the marine products after cooling is 0° C.~4° C. After cooling, the bacteria content in the marine products is also dramatically reduced because the highly activated water is with strong sterilization capability.

Preferably, the freezing plates 32 are connected with the ship-borne refrigeration system to form a circulating circuit. Liquid ammonia, Freon, carbon dioxide etc. with temperature at −35° C.~−25° C. or lower is used as the cryogen.

Preferably, the UHF electromagnetic field cavity is made of stainless steel, in which three UHF electromagnetic field generating systems 33 are installed in the front surface, the rear surface and the bottom surface, respectively. The UHF electromagnetic field generating system 33 is composed of a transformer, a magnetron, a waveguide, a frequency conversion board and a power conditioner. The frequency of the UHF electromagnetic field is 0.9 GHz-4 GHz and the power is 100-500 W/kg products. When the pulsed ultrasonic monitoring system shows the initiation of nucleation, the UHF electromagnetic field treatment is started. Intermittent treatment is applied. In an electromagnetic field cycle, the actual working time of electromagnetic field is 50%-60% of one cycle. When the ultrasonic monitoring system shows that the ice content is higher than 90%, the UHF electromagnetic field treatment is stopped.

Figure 2:
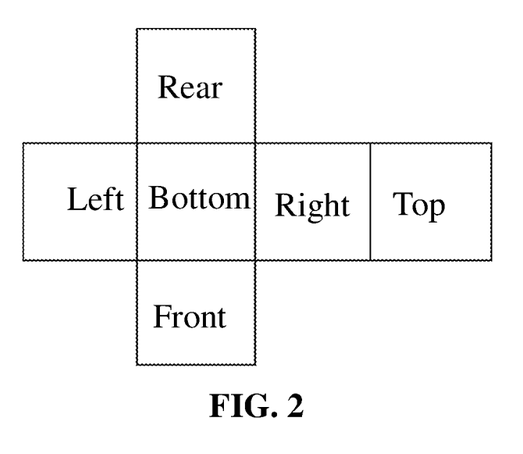
FIG. 2 shows an unfolded drawing of an UHF electromagnetic field cavity.

FIG. 2 is the unfolded drawing of the UHF electromagnetic field cavity, which clearly shows the position where the UHF electromagnetic field generating system is installed.

Figure 3:
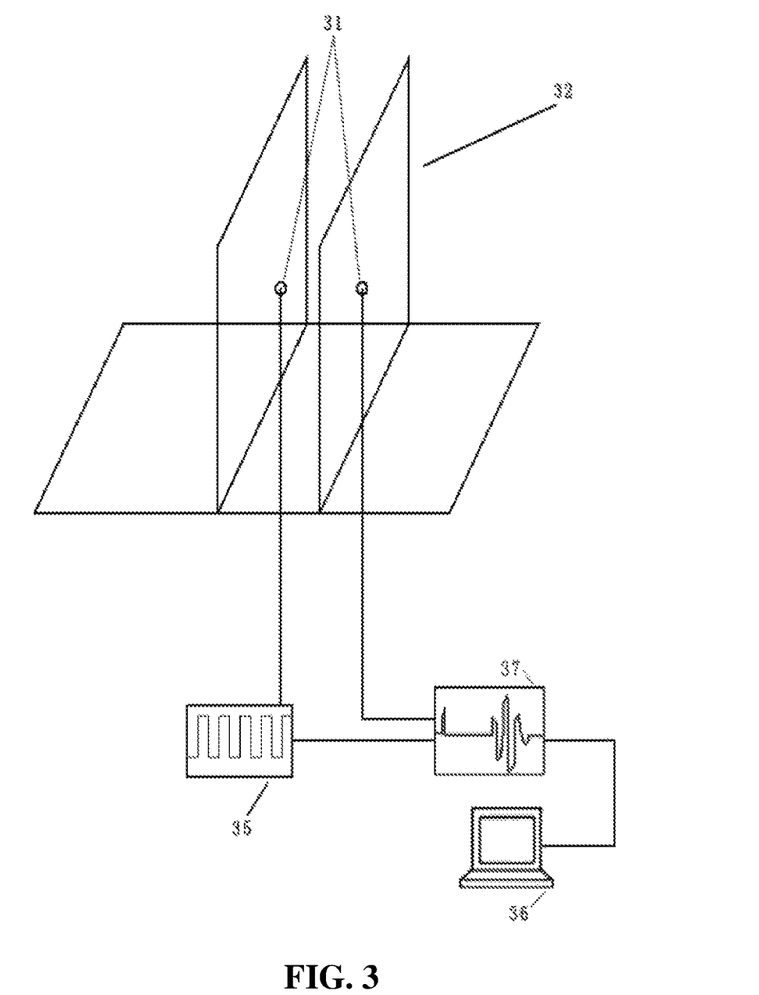
FIG. 3 shows a drawing of a pulsed ultrasound monitoring system.

FIG. 3 is a diagram of the pulsed ultrasonic monitoring system, which is composed of a pulse generator, two piezoelectric plates, an oscilloscope and a computer. The two piezoelectric plates are parallelly installed in the middle of two adjacent freezing plates, one of which is served as emitter and another is served as receptor. An ultrasonic pulse is induced in the emitter with the pulse generator and received in the receptor. The signal is captured and visualized with an oscilloscope which is connected with a computer.

Embodiment 2

Referring to FIG. 1, a ship-borne method for freezing of fish after treated by highly activated water and nondestructive sensing of ice crystals, is executed as following:

1) Purchase of fish: Fresh fish are purchased from the local market, which are with bright eyes, bright color, intact scales and hard meat. The purchased fish are sent to the laboratory within 20 minutes.

2) Preparation of highly activated water: 10 L seawater with salt content at 10% is pumped into the self-made plasma reactor, whose size is 40 cm×40 cm×40 cm. The reactor is a closed container, which has a gas inlet, a gas outlet, a water inlet and a water outlet. The water inlet and outlet are closed when seawater is not fed into or discharged out. The gas outlet is connected with a conduit which introduces the plasma-generated tail gas into the seawater in the tail gas collecting device. The tail gas collecting device is a closed container with size 40 cm×40 cm×40 cm, which also has a gas inlet, a gas outlet, a water inlet and a water outlet. 10 L seawater with salt content at 10% is used as tail gas adsorbent. The water inlet and outlet are closed when seawater is not fed into or discharged out. Oxygen is introduced into the plasma reactor for 5 min before plasma treatment with a flow rate of 5.0 L/min. Subsequently, corona discharge between the electrode and the liquid surface is carried out. The distance between the electrode and the liquid surface is 10 cm. The output voltage of the power supply is 80 kV, and the treatment time is 60 minutes. Both the plasma-treated seawater and the tail gas-treated seawater is termed as highly activated water.

58% compared with the control group. After storing at −18° C. for 60 days, the thawing drip loss in the experimental group is reduced 21% compared with the control group. After storing at −18° C. for 180 days, several indexes for the freshness of the frozen fish including TVB-N, TMA-N, TBA, histamine, salt-solubility of act myosin were determined (Table 1). Compared with the control group, the contents of TVB-N, TMA-N,TBA,histamine were reduced by 39.1%, 37.6%, 29.4% and 37.3%, respectively. This indicates that the method of the present invention clearly inhibits the quality change of the frozen fish and maintains its freshness, thus significantly improves its quality.

TABLE 1

The quality index of the control and experimental group in EMBODIMENT 2

| | Average diameter of ice crystals (μm) | Drip loss (%) | TVB-N (mg/100 g) | TMA-N (mg/100 g) | TBA (mg MDA/kg) | Histamine (mg/1000 g) | Salt-solubility of actomyosin (mg/g) |
|---|---|---|---|---|---|---|---|
| The control group | 34.3 | 10.1 | 24.3 | 3.75 | 2.48 | 10.06 | 67.3 |
| The experimental group | 14.4 | 8.0 | 14.8 | 2.34 | 1.75 | 6.31 | 79.2 |

3) Cooling of the highly activated water and cooling of fish with the cooled highly activated water: After plasma treatment, the valves of water outlet of both the plasma reactor and the tail gas collecting device are opened. The activated water is pumped into the heat exchanger by water pumps. Freon at −35° C. is used as the cryogen for the heat exchanger. The temperature of activated water after cooling is reduced to about −3° C. Then, the cooled activated water is pumped into the spraying device and sprayed onto the surface of fish to cool the fish for two times. The cooling period is 10 min for each time. After spraying, the surface temperature of fish body dropped to about 0° C. Because the highly activated water is with strong sterilization capability, bacterial reduction was also achieved after the cooling processes.

4) Freezing of the fish body: After cooling, the fish is exposed to freezing in vertical freezing plates, in which Freon at −35° C. is used as the cryogen. At the same time, the pulsed ultrasonic monitoring system was opened to monitor the ice content in the fish. Based on the ultrasonic monitoring system, the UHF electromagnetic field processing is turned on at the beginning of nucleation, and stopped at the completion of crystallization. The electromagnetic field is processed intermittently. In a processing period, the actual working time is 50% of its cycle. The processing intensity of the electromagnetic field is 400 W/kg fish, and the frequency of the electromagnetic field is 0.9 GHz. When the temperature of the fish reaches −18° C., the freezing is stopped and then frozen at −18° C.

5) Control group: The fresh fish in the control group is kept in frozen storage at −18° C.

6) Quality comparison: After freezing, the ice crystals in the experimental group and in the control group were analyzed. The results showed that the average size of the ice crystal in the experimental group is reduced Embodiment 3

Referring to FIG. 1, a ship-borne method for freezing offish after treated by highly activated water and nondestructive sensing of ice crystals, is executed as following:

1) Purchase of fish: Fresh fish are purchased from the local market, which are with bright eyes, bright color, intact scales and hard meat. The purchased fish are sent to the laboratory within 20 minutes.

2) Preparation of highly activated water: 10 L seawater with salt content at 1.5% is pumped into the self-made plasma reactor, whose size is 40 cm×40 cm×40 cm. The reactor is a closed container, which has a gas inlet, a gas outlet, a water inlet and a water outlet. The water inlet and outlet are closed when seawater is not fed into or discharged out. The gas outlet is connected with a conduit which introduces the plasma-generated tail gas into the seawater in the tail gas collecting device. The tail gas collecting device is a closed container with size 40 cm×40 cm×40 cm, which also has a gas inlet, a gas outlet, a water inlet and a water outlet. 10 L seawater with salt content at 1.5% is used as tail gas adsorbent. The water inlet and outlet are closed when seawater is not fed into or discharged out. Oxygen is introduced into the plasma reactor for 5 min before plasma treatment with a flow rate of 5.0 L/min. Subsequently, corona discharge between the electrode and the liquid surface is carried out. The distance between the electrode and the liquid surface is 20 cm. The output voltage of the power supply is 20 kV, and the treatment time is 20 minutes. Both the plasma-treated seawater and the tail gas-treated seawater is termed as highly activated water.

3) Cooling of the highly activated water and cooling of fish with the cooled highly activated water: After plasma treatment, the valves of water outlet of both the plasma reactor and the tail gas collecting device are opened. The activated water is pumped into the heat exchanger by water pumps. Freon at −35° C. is used as the cryogen for the heat exchanger. The temperature of activated water after cooling is reduced to about −1° C. Then, the cooled activated water is pumped into the spraying device and sprayed onto the surface of the fish to cool the fish for two times. The cooling time is 5 min for each time. After spraying, the surface temperature of the fish body is dropped to about 3° C. Because the highly activated water was with strong sterilization capability, bacterial reduction was also achieved after the cooling processes.

4) Freezing of the fish body: After cooling, the fish is exposed to freezing in vertical freezing plates, in which Freon at −35° C. is used as the cryogen. At the same time, the pulsed ultrasonic monitoring system was opened to monitor the ice content of the fish during the freezing process. Based on the ultrasonic monitoring system, the UHF electromagnetic field processing is turned on at the beginning of nucleation, and stopped at the completion of crystallization. The electromagnetic field is processed intermittently. In a processing period, the actual working time is 50% of its cycle. The processing intensity of the electromagnetic field is 100 W/kg fish, and the frequency of the electromagnetic field is 2.45 GHz. When the temperature of the fish reaches −26° C., the freezing is stopped and then kept at −26° C. for frozen storage.

5) Control group: The fresh fish in the control group is kept in frozen storage at −26° C.

6) Quality comparison: After freezing, the ice crystals in the experimental group and in the control group were analyzed. The results showed that the average size of the ice crystal in the experimental group is reduced 51% compared with the control group. After storing at −26° C. for 60 days, the thawing drip loss in the experimental group is reduced 19% compared with the control group. After storing at −26° C. for 180 days, several indexes for the freshness of the frozen fish including TVB-N, TMA-N, TBA, histamine, salt-solubility of actomyosin were determined. Compared with the control group, the contents of TVB-N, TMA-N, TBA, histamine were reduced by 33.2%, 30.4%, 25.8% and 35.2%, respectively (Table 2). This indicates that the method of the present invention clearly inhibits the quality change of the frozen fish and maintains its freshness, thus significantly improves its quality.

Embodiment 4

Referring to FIG. 1, a ship-borne method for freezing of fish after treated by highly activated water and nondestructive sensing of ice crystals, is executed as following:

1) Purchase of fish: Fresh fish are purchased from a local market, which are with bright eyes, bright color, intact scales and hard meat. The purchased fish are sent to the laboratory within 20 minutes.

2) Preparation of highly activated water: 10 L seawater with salt content at 5% is pumped into the self-made plasma reactor, whose size is 40 cm×40 cm×40 cm. The reactor is a closed container, which has a gas inlet, a gas outlet, a water inlet and a water outlet. The water inlet and outlet are closed when seawater is not fed into or discharged out. The gas outlet is connected with a conduit which introduces the plasma-generated tail gas into the seawater in the tail gas collecting device. The tail gas collecting device is a closed container with size 40 cm×40 cm×40 cm, which also has a gas inlet, a gas outlet, a water inlet and a water outlet. 10 L seawater with salt content at 5% is used as tail gas adsorbent. The water inlet and outlet are closed when seawater is not fed into or discharged out. Oxygen is introduced into the plasma reactor for 5 min before plasma treatment with a flow rate of 5.0 L/min. Subsequently, corona discharge between the electrode and the liquid surface is carried out. The distance between the electrode and the liquid surface is 15 cm. The output voltage of the power supply is 40 kV, and the treatment time is 40 minutes. Both the plasma-treated seawater and the tail gas-treated seawater is termed as highly activated water.

3) Cooling of the highly activated water and cooling of fish with the cooled highly activated water: After plasma treatment, the valves of water outlet of both the plasma reactor and the tail gas collecting device are opened. The activated water is pumped into the heat exchanger by water pumps. Freon at −35° C. is used as the cryogen for the heat exchanger. The temperature of activated water after cooling is reduced to about −2° C. Then, the cooled activated water is pumped into the spraying device and sprayed onto the surface of the fish to cool the fish for two times. The cooling time is 5 min for each time. After spraying, the surface temperature of the fish body is dropped to about 1° C. Because the

TABLE 2

The quality index of the control and experimental group in EMBODIMENT 3

|  | Average diameter of ice crystals (μm) | Drip loss (%) | TVB-N (mg/100 g) | TMA-N (mg/100 g) | TBA (mg MDA/kg) | Histamine (mg/1000 g) | Salt-solubility of actomyosin (mg/g) |
|---|---|---|---|---|---|---|---|
| The control group | 23.3 | 5.1 | 19.6 | 3.12 | 1.28 | 6.3 | 72.3 |
| The experimental group | 11.4 | 4.2 | 13.1 | 2.17 | 0.95 | 4.08 | 84.6 | highly activated water was with strong sterilization capability, bacterial reduction was also achieved after the cooling processes.

4) Freezing of the fish body: After cooling, the fish is exposed to freezing in vertical freezing plates, in which Freon at −35° C. is used as the cryogen. At the same time, the pulsed ultrasonic monitoring system was opened to monitor the ice content of the fish during the freezing process. Based on the ultrasonic monitoring system, the UHF electromagnetic field processing is turned on at the beginning of nucleation, and stopped at the completion of crystallization. The electromagnetic field is processed intermittently. In a processing period, the actual working time is 50% of its cycle. The processing intensity of the electromagnetic field is 200 W/kg fish, and the frequency of the electromagnetic field is 2.45 GHz. When the temperature of the fish reaches −30° C., the freezing is stopped and then kept at −30° C. for frozen storage.

5) Control group: The fresh fish in the control group is kept in frozen storage at −30° C.

6) Quality comparison: After freezing, the ice crystals in the experimental group and in the control group were analyzed. The results showed that the average size of the ice crystal in the experimental group is reduced 51% compared with the control group. After storing at −30° C. for 60 days, the thawing drip loss in the experimental group is reduced 28.2% compared with the control group. After storing at −30° C. for 180 days, several indexes for the freshness of the frozen fish including TVB-N, TMA-N,TBA,histamine, salt-solubility of actomyosin were determined. Compared with the control group, the contents of TVB-N,TMA-N, TBA,histamine were reduced by 33.9%, 35%, 37.7% and 33.2%, respectively (Table 3). This indicates that the method of the present invention clearly inhibits the quality change of the frozen fish and maintains its freshness, thus significantly improves its quality.

chamber; the plasma reactor is a sealed container, the sealed container comprises a seawater inlet, an activated water outlet, a gas inlet and a gas outlet; the gas inlet is connected with the gas chamber and the gas outlet is connected with the tail gas collecting device;

the tail gas collecting device is also a sealed container, comprising a seawater inlet, an activated water outlet, a gas inlet and a gas outlet;

the heat exchanger is connected with water outlets of both the plasma reactor and the tail gas collecting device;

the cooling system comprises a conveyor belt and two water spraying devices; the two water spraying devices are connected with the heat exchanger with pumps; and the freezing system comprises an UHF electromagnetic field processing chamber, several vertical freezing plates in the chamber, three UHF electromagnetic field systems and an ultrasonic monitoring system; the UHF electromagnetic field processing chamber is a metal cavity; a front surface, rear surface and bottom surface of the metal cavity are installed with a UHF electromagnetic field generating system; the UHF electromagnetic field generating system is with a frequency at 0.9 GHz-4 GHz.

2. The device according to claim 1, wherein the ultrasonic monitoring system is a multi-frequency pulse generator, a frequency of the multi-frequency pulse generator is in 30 MHz-100 MHz, the multi-frequency pulse generator comprises a pulse generator, two piezoelectric plates, an oscilloscope and a computer; two piezoelectric plates are parallelly installed in a middle of two adjacent vertical freezing plates, one of the two adjacent vertical freezing plates is served as an emitter and the other is served as a receptor; an ultrasonic pulse is induced in the emitter with the pulse generator and received in the receptor; and a signal is captured and visualized with an oscilloscope connected with the computer.

3. The device according to claim 1, wherein each of the U1TF electromagnetic field systems comprises a trans-

TABLE 3

| | The quality index of the control and experimental group inembodiment3 | | | | | | |
|---|---|---|---|---|---|---|---|
| | Average diameter of ice crystals (μm) | Drip loss (%) | TVB-N (mg/100 g) | TMA-N (mg/100 g) | TBA (mg MDA/kg) | Histamine (mg/1000 g) | Salt-solubility of actomyosin (mg/g) |
| The control group | 18.5 | 3.9 | 16.1 | 2.0 | 0.69 | 4.1 | 87.7 |
| The experimental group | 9.1 | 2.8 | 10.5 | 1.32 | 0.43 | 2.74 | 95.3 |

What is claimed is:

1. A device for ship-borne freezing of marine products after treated by highly activated water and nondestructive sensing of ice crystals, the device comprises a plasma generation system, a tail gas collecting system, a heat exchanger, a cooling system and a freezing system;

the plasma generation system comprises a high voltage power supply, an electrode, a plasma reactor and a gas former, a magnetron, a waveguide, a frequency conversion board and a power conditioner.

4. The device according to claim 1, wherein the heat exchanger is connected with a ship-borne refrigeration system to form a circulation loop; and a substance with a temperature at −35° C.-25° C. or lower is used as a cryogen.

* * * * *